(12) United States Patent
Stadtfeld

(10) Patent No.: US 11,821,492 B2
(45) Date of Patent: Nov. 21, 2023

(54) DOUBLE DIFFERENTIAL REDUCER ULTRA-HIGH REDUCTION TRANSMISSION

(71) Applicant: THE GLEASON WORKS, Rochester, NY (US)

(72) Inventor: Hermann J. Stadtfeld, Manderscheid (DE)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 17/757,363

(22) PCT Filed: Jan. 14, 2021

(86) PCT No.: PCT/US2021/013338
§ 371 (c)(1),
(2) Date: Jun. 15, 2022

(87) PCT Pub. No.: WO2021/146360
PCT Pub. Date: Jul. 22, 2021

(65) Prior Publication Data
US 2023/0035884 A1  Feb. 2, 2023

Related U.S. Application Data

(60) Provisional application No. 62/960,943, filed on Jan. 14, 2020.

(51) Int. Cl.
*F16H 48/08* (2006.01)
*F16H 1/28* (2006.01)
(52) U.S. Cl.
CPC ........... *F16H 1/2854* (2013.01); *F16H 48/08* (2013.01); *F16H 2001/2881* (2013.01); *F16H 2048/082* (2013.01)

(58) Field of Classification Search
CPC .................. F16H 1/2854; F16H 48/08; F16H 2001/2881; F16H 2048/082; F16H 57/038
See application file for complete search history.

(56) References Cited

U.S. PATENT DOCUMENTS 1,902,374 A * 3/1933 Pirinoli ................. F16H 1/2854
416/129
2,480,806 A * 8/1949 Desmoulins ............ F16H 48/08
416/129

FOREIGN PATENT DOCUMENTS

CN  104329435 A * 2/2015 ............. F16H 48/08
CN  108413003 A * 8/2018 ............. F16H 48/05
(Continued)

OTHER PUBLICATIONS

International Search Report and Written Opinion for PCT/US2021/013338, ISA/EPO, dated Mar. 30, 2021, 11 pgs.

*Primary Examiner* — Justin Holmes
(74) *Attorney, Agent, or Firm* — Robert L. McDowell

(57) ABSTRACT

A transmission having a housing (18), at least a first input (20) rotatable about a first input axis ($I_{A1}$), and at least a first output (26) rotatable about a first output axis ($O_A1$). The transmission further includes a first outer side gear (14) connected to and drivable by the first input, a first planet gear set comprising a first inner planet gear (11) and a first outer planet gear (15) with the inner and outer planet gears being rigidly connected to, and in axial alignment with, one another. The first planet gear set is rotatable (22, 24) via the first outer side gear and is also rotatable (23) about the first output axis. The transmission further includes a second outer side gear (16) in mesh with the first outer planet gear, and a second inner side gear (12) connected to the first output and being rotatable about the first output axis via the first inner planet gear.

12 Claims, 4 Drawing Sheets

(56) References Cited

FOREIGN PATENT DOCUMENTS

| EP | 2847492 A1 | 3/2015 | | |
|----|------------|--------|---|---|
| GB | 194593 A | 3/1923 | | |
| WO | WO-2020161978 A1 * | 8/2020 | ........... | F16H 37/082 |
| WO | 2021/096844 A1 | 5/2021 | | |

* cited by examiner

DOUBLE DIFFERENTIAL REDUCER ULTRA-HIGH REDUCTION TRANSMISSION

FIELD OF THE INVENTION

The invention is directed to high reduction transmissions and in particular to a double differential reducer, high reduction transmission.

BACKGROUND OF THE INVENTION

The basic function of high reduction transmissions is reducing high input RPM into lower RPMs, for example to propel the wheels of a vehicle or the rotor of a helicopter. The output RPM of such a transmission is usually in the range between zero and 1,000 RPM. The input RPM can be 20,000 RPM and higher if the prime mover is an electric motor or a jet engine, for example.

The state of the art transmissions that can accomplish high reductions include:
1. Multi stage transmissions employing cylindrical gears
2. Bevel worm gear reductions with ratios of 20 in one stage
3. Pericyclic transmissions with nutating bevel gears
4. Cycloidal transmissions Multi stage transmissions with cylindrical gears require a multitude of shafts with bearings and gears. For a reduction ratio of 20, at least four stages are required. Four reduction stages require 4 shafts, 8 bearings and 4 gear meshes. Observing only 4 gear meshes indicates an overall efficiency of 97.6% if the efficiency of one single stage is 99.4% ($0.994^4$=0.976). Four stage cylindrical transmissions require a rather large transmission housing envelope.

Bevel worm gear drives may be referred to as, for example, High Reduction Hypoids (HRH) or Super Reduction Hypoids (SRH). The worm-shaped pinions usually have 1 to 5 teeth and the ring gears typically have 27 to 75 teeth. The maximal achievable ratios are in the range of 75. Ratios above about 15 have a reduced back driving capability. Gearsets without back driving capability are self-locking. Self-locking gearsets cannot be used in a vehicle drive train or in a helicopter main rotor drive. Bevel worm gear drives also create high sliding velocities due to the large component in face width direction. For example, a five tooth SRH pinion, meshing with a 60 tooth ring gear creates 617 m/min relative sliding between the flank surfaces with a pinion speed of 10,000 RPM (equal to transmission input speed). This is higher than the maximum sliding expected in a hypoid axle drive of a sports car while driving faster than 125 MPH (pinion speed=4,000 RPM). The example explains that a doubling of the transmission input will not only reduce the efficiency but has also the risk of surface damage and premature failure.

Pericyclic transmissions (e.g. PCT/US2020/059810) can achieve very high reductions in the range of about 20 to 100 without generating high relative surface sliding. As the shaft angle between two bevel gears approaches 180°, the relative sliding velocity drops down to zero. Because of shaft angles higher than 160° in the most common pericyclic transmissions, the relative sliding velocities are not critical, even if the input speeds are 20,000 RPM or higher. The disadvantage of the pericyclic transmission is the angled bearing seat of the nutating member and the extremely high forces which are applied to the bearing at the angled seat. Another possible problem source in pericyclic transmissions are the axial mass forces the nutating members generate. High speed pericyclic transmissions require a mirror image arrangement of an even number of nutating members as well as precise timing of the gears and precise balancing.

Cycloidal transmissions are the two-dimensional analog to pericyclic transmissions. One revolution of the eccentric input shaft will rotate the output shaft by one to two tooth pitches. The radial mass forces of cycloidal transmissions cannot be compensated by a second cycloidal disk arrangement side by side. As a result, high reduction cycloidal transmissions are only used when low input speeds are reduced in very low output speeds.

If high ratios between 10 and 100 are to be achieved, designers may prefer multi-stage cylindrical transmissions often combined with planetary reductions. Multi-stage transmissions are well known in the art and deliver a reasonable power density.

There remains a need to create a compact high reduction transmission with easy to manufacture components and predictable operating conditions. Preferably, if the individual involved parts of the transmission are, per se, each known as standard machine design components, then the prediction of durability and endurance life is enhanced by applying the calculation algorithms provided by the standards of, for example, the AGMA (American Gear Manufacturers Association), ISO (International Standardization Organization) and/or other national standards. Those algorithms rely on tens of thousands of fatigue life tests as well as many application factors which have been evaluated for many decades. In safety engineering, such proven algorithms and application factors are valuable tools to the engineer.

SUMMARY OF THE INVENTION

The invention is directed to a transmission comprising a housing, at least a first input being rotatable about a first input axis, and at least a first output being rotatable about a first output axis. The transmission further comprises a first outer side gear being a bevel gear and being connected to and drivable by the first input.

The transmission additionally comprises a first planet gear set comprising a first inner planet gear and a first outer planet gear with the first inner planet gear and the first outer planet gear each being a bevel gear and with the first inner planet gear being rigidly connected to, and in axial alignment with, the first outer planet gear. The first planet gear set is rotatable via the first outer side gear. The first inner planet gear is rotatable about a first planet gear axis and the first outer planet gear is rotatable about the first planet gear axis thereby resulting in the first planet gear set being rotatable about the first planet gear axis. Furthermore, the first planet gear set is also rotatable about the first output axis.

The inventive transmission further includes a second outer side gear being a bevel gear and being in mesh with the first outer planet gear, and a second inner side gear being a bevel gear and being connected to the first output with the second inner side gear being rotatable via the first inner planet gear with the second inner side gear being rotatable about the first output axis.

With the inventive transmission, for a predetermined rotational velocity of the first input, rotation of the first planet gear set about the first output axis effects a first rotational differential component of the second inner side gear, and rotation of the first planet gear set about the first planet gear axis effects a second rotational differential component of the second inner side gear, wherein the first rotational differential component and the second rotational differential component result in a second inner side gear velocity and first output rotational velocity that is less than the predetermined input rotational velocity.

DETAILED DESCRIPTION OF THE PREFERRED EMBODIMENT

Figure 1:
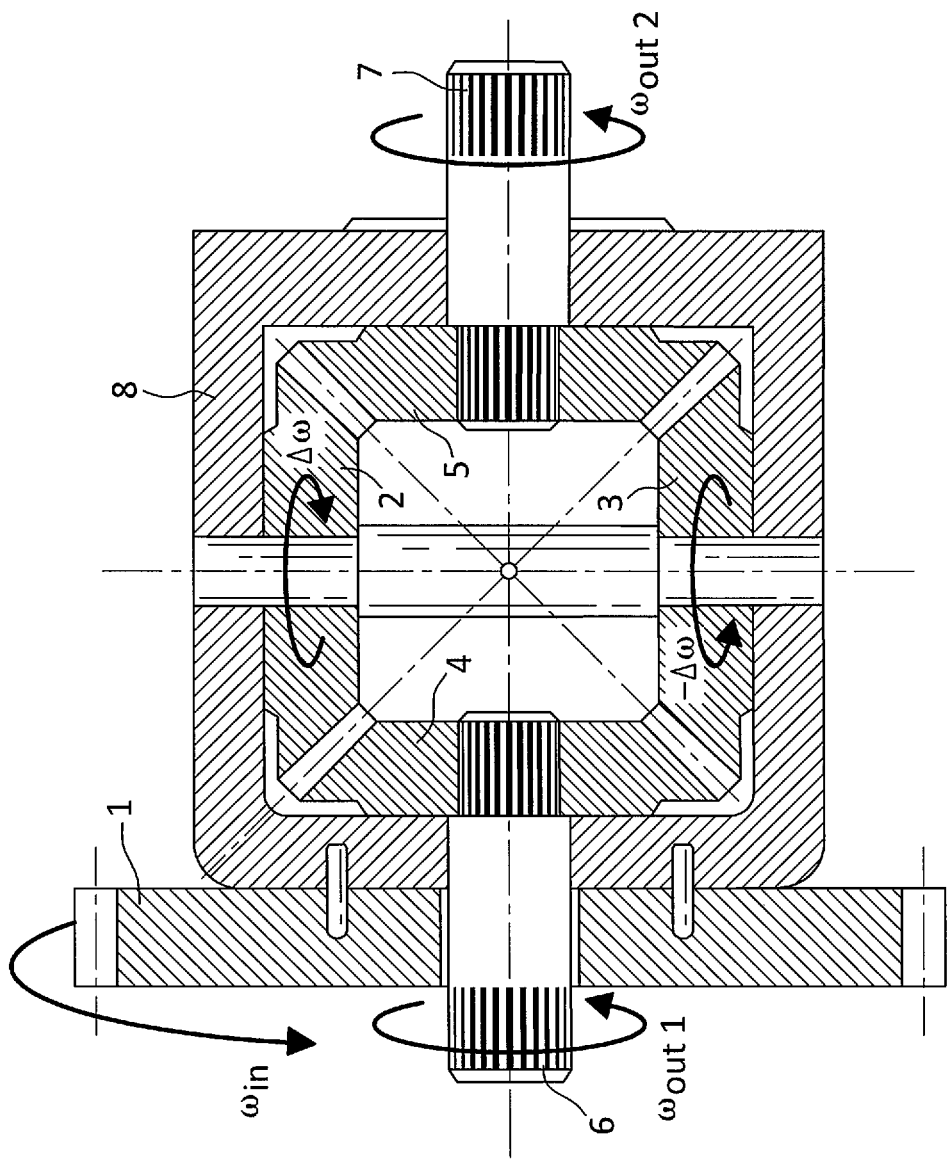
FIG. 1 shows an example of an automotive differential.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. The size and relative sizes of certain aspects or elements may be exaggerated for clarity or detailed explanation purposes. For a better understanding of the invention and ease of viewing, doors, casings, housings, internal or external guarding, etc. may have been omitted from the drawings.

The use of "including", "having" and "comprising" and variations thereof herein is meant to encompass the items listed thereafter and equivalents thereof as well as additional items. The use of letters or numbers to identify elements of a method or process is simply for identification and is not meant to indicate that the elements should be performed in a particular order. As used herein, the singular forms "a", "an" and "the" are intended to include the plural forms as well, unless the context clearly indicates otherwise and the term "and/or" includes any and all combinations of one or more of the associated listed items.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless explicitly stated.

Differentials may be considered to be an expansion of planetary transmissions, which are two dimensional, into the third dimension. In planetary gears it is possible to achieve particular ratios, for example by connecting the internal gear to the sun gear or by connecting the internal gear to the housing.

In general, a standard differential splits input engine torque two ways, allowing each output of the differential to spin at a different speed. The function of a standard differential can be explained with reference to FIG. 1 which shows a two dimensional view of a differential unit such as used in automobiles. The input rotation is transmitted from the final drive gear 1 via the carrier 8 to the two planet gears (i.e. planets) 2 and 3. The planets 2 and 3 transmit the rotation to the side gears 4 and 5 which are each connected to an output shaft 6 and 7 respectively. If the output shafts 6 and 7 are connected to the driving wheels of a vehicle, then, in case of straight driving and equal traction on both wheels, $\omega_{out1}$ and $\omega_{out2}$ are equal among each other and are equal to the input speed $\omega_{in}$.

In the case of driving through a curve, the wheel towards the outside of the curve (for example connected with shaft 6) has to drive a longer distance than the wheel towards the inside of the curve (for example connected to shaft 7). In order to prevent wheel slippage in cases of driving through curves, the wheel towards the outside of the curve has to rotate faster and the wheel towards the inside of the curve has to rotate slower. A differential accommodates this requirement automatically. With a constant driving speed $\omega_{in}$, shaft 7 cannot rotate with $\omega_{in}$ while maintaining the same traction torque as shaft 6, it requires a lower speed $\omega_{out2}=\omega_{in}-\Delta\omega$. In turn, shaft 6 requires a higher speed $\omega_{out1}=\omega_{in}+\Delta\omega$ has to rotate faster in order to maintain the same traction torque as shaft 7. The planets 2 and 3 will automatically begin to rotate with plus or minus $\Delta\omega$ in order to maintain the torque equilibrium between the shafts 6 and 7. Differential transmissions are considered a three-dimensional version of planetary transmissions.

In the most common application in automobiles, the side gears 4 and 5 are connected to the driving wheels via the output shafts 6 and 7. If both driving wheels have the same traction while the vehicle drives straight and if both wheels have the same diameter, then there will be no relative motion between the four gears 2, 3, 4 and 5 ($\Delta\omega=0$) and the input rotation $\omega_{in}$ is transmitted with a ratio of one to the two output shafts 6 and 7 ($\omega_{out1}=\omega_{out2}=\omega_{in}$). In the case of driving through a curve, the wheel towards the outside of the curve (for example connected with shaft 6) has to drive a longer distance then the wheel towards the inside of the curve (for example connected to shaft 7). The differential enables this requirement by a rotation of the planets (in the example gear 2 rotates $+\Delta\omega$ and gear 3 rotates with $-\Delta\omega$). Such a rotation results in the output speed of the wheel towards the outside of the curve being $\omega+\Delta\omega$ while the output speed of the wheel towards the inside of the curve is $\omega-\Delta\omega$ which will maintain the vehicle speed (equivalent to $\omega$) and accommodate the curve driving condition without wheel slippage or traction loss.

whereas:
$\omega$ . . . Carrier input speed
$\Delta\omega$ . . . Delta rotation of the side gears If the number of teeth of all four differential gears is identical, then the rotation of planets is exactly $\Delta\omega$ (e.g. the upper rotates in the clockwise (CW) direction and the lower in the counter clockwise (CCW) direction).

Figure 2:
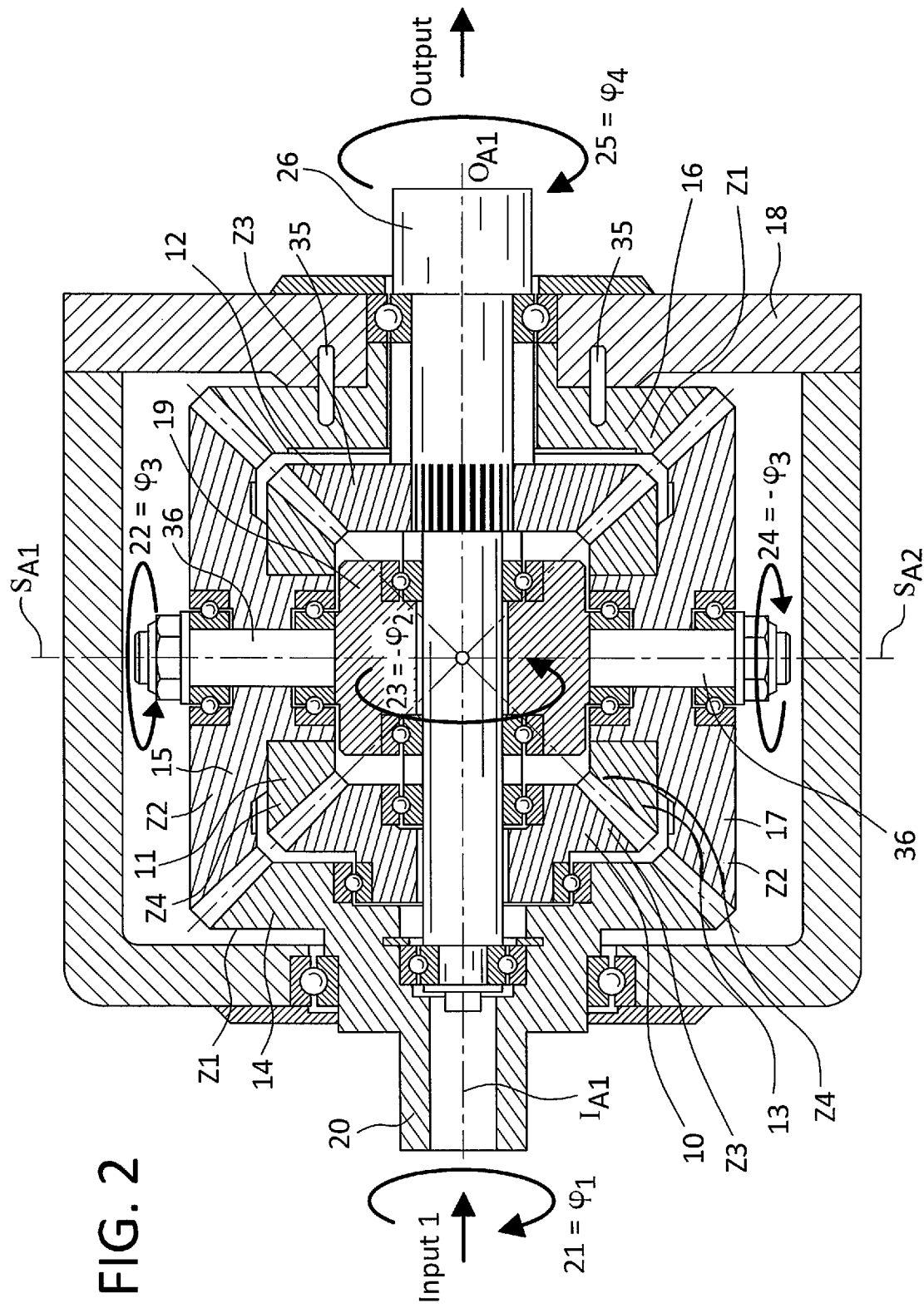
FIG. 2 illustrates a double differential transmission.

An inventive solution for a low, medium or high reduction transmission with high power density is the double differential shown in FIG. 2. The double differential transmission is symmetric and has a high power density. The double differential transmission preferably has a symmetric orientation of eight gears, comprising first inner planet gear 11, second inner planet gear 13, first inner side gear 10, second inner side gear 12, first outer planet gear 15, second outer planet gear 17, first outer side gear 14, and second outer side gear 16, all located around a carrier 19 comprising a central sleeve with attached diametrically opposed posts 36 each having a threaded end portion to which a nut can be secured. An input rotation $\varphi_1$ (about axis $I_{A1}$) from shaft 20 to gear 14 will rotate gears 15 and 17 by $\varphi_3$ and $-\varphi_3$ around their respective post 36. Because gear 16 is connected non-rotatably to the housing 18 (e.g. via pins 35, as shown) the rotations $\varphi_3$ (about axis $S_{A1}$) and $-\varphi_3$ (about axis $S_{A2}$) will actuate a rotation $-\varphi_2$ (23) of the carrier 19 with the magnitude of the rotation depending on the gear teeth number ratio $z_2/z_1$. First inner side gear 10 is optional in the embodiment of FIG. 2 (and FIG. 3) but may be included for balance and/or stability purposes.

First inner planet gear 11 is rigidly connected to first outer planet gear 15, such as via a spline connection, and second inner planet gear 13 is rigidly connected to second outer planet gear 17, such as via a spline connection. The connection between 11 and 15 as well as 13 and 17 causes a direct transmission of the carrier 19 rotation to the second inner side gear 12, functioning as an output gear, as a first rotational component (first differential). The rotations $\varphi_3$ and $-\varphi_3$ (rotation 22 about axis $S_{A1}$ and rotation 24 about axis $S_{A2}$) are also transmitted to gears 11 and 13 which represent a second component of rotation (second differential) to second inner side gear 12. The magnitude of this second rotation depends on the gear teeth number ratio $z_3/z_4$. In case of equal tooth numbers of all 8 gears, the ratio is infinite, which means the output shaft 26 (rotatable about axis $O_{A1}$) will not rotate (rotation 25=$\varphi_4$=0) as result of an input rotation 21. If, for example, the tooth number $z_2$ is only different by one tooth from all the other tooth numbers $z_1$, $z_3$, $z_4$, then the overall transmission ratio $\varphi_1/\varphi_4$ becomes very high. Preferably, axes $S_{A1}$ and $S_{A2}$ are coincident (i.e. $S_{A1}$=$S_{A2}$).

The input rotation 21 from shaft 20 is transmitted to gears 15 and 17 and causes a rotation 22 of gear 15, and a rotation 24 of gear 17. Gears 15 and 17 are both in mesh with gear 16. Gear 16 is rigidly connected to the housing 18. The fact that gear 16 cannot rotate will cause a rotation 23 of the carrier 19. Gears 15 and 11 as well as gears 17 and 13 are rotationally constrained with each other. The carrier rotation 23 gives a first component of rotation (first differential) to second inner side gear 12. The rotations 22 and 24 add a second component of rotation (second differential) to second inner side gear 12. If all eight involved bevel gears have the same number of teeth, then the output rotation 25 would be zero. The explanation is that for example a 90° rotation $\varphi_2$ of the carrier 19 would rotate gears 15 and 17 by 90° in the directions 22 and 24. The output gear 12 therefore receives a 90° rotation $\varphi_2$ from the carrier and a 90° rotation $\varphi_3$ (in the opposite direction) from the gears 11 and 13 and as a result will not rotate independent from the input rotation 21. While this embodiment seems not of any practical interest, the example is used to demonstrate the functionality of double differential transmissions. In the example the ratio is $\varphi_1/\varphi_4$=∞.

A derivation of the equation for the ratio by using individual number of teeth results in a variety of possible ratios by variation of the tooth numbers of the gears 14/16 versus 15/17 and 10/12 versus 11/13.

| | | |
|---|---|---|
| or: | $\varphi_2/\varphi_3 = z_2/z_1$ | (1) |
| | $\varphi_3 = \varphi_2 \cdot z_1/z_2$ | (2) |
| | $\varphi_4 = \varphi_2 - \varphi_3 \cdot z_4/z_3$ | (3) |
| | $\varphi_1 = \varphi_2 + \varphi_3 \cdot z_2/z_1$ | (4) |
| plug (2) in (4): | $\varphi_1 = \varphi_2 + \varphi_2 = 2 \cdot \varphi_2$ | (5) |
| or: | $\varphi_2 = \varphi_1/2$ | (6) |
| plug (6) in (3): | $\varphi_4 = \varphi_1/2 - \varphi_3 \cdot z_4/z_3$ | (7) |
| plug (6) in (2): | $\varphi_3 = \varphi_1/2 \cdot z_1/z_2$ | (8) |
| plug (8) in (7): | $\varphi_4 = \varphi_1/2 \cdot [1 - z_1/z_2 \cdot z_4/z_3]$ | (9) |
| re-arranged: | $R = \varphi_1/\varphi_4 = 2/[1 - (z_1 \cdot z_4)/(z_2 \cdot z_3)]$ | (10) | wherein:

$z_1$ . . . Number of teeth gear 14 and gear 16
$z_2$ . . . Number of teeth gear 15 and gear 17
$z_3$ . . . Number of teeth gear 10 and gear 12
$z_4$ . . . Number of teeth gear 11 and gear 13
$\varphi_1$ . . . Angle of rotation gear 14
$\varphi_2$ . . . Angle of rotation carrier 19
$\varphi_3$ . . . Angle of rotation gear 15 (and gear 17 in negative $\varphi_3$ direction)
$\varphi_4$ . . . Angle of rotation gear 12 (and output shaft 26)
R . . . Ratio of input speed divided by output speed In the following four examples, different number of teeth combinations are used to demonstrate the extremely high range of ratios which can be realized with the double differential without a significant change of the transmission size:

Example 1

$z_1$=40; $z_2$=39; $z_3$=40; $z_4$=40; Ratio R=−78.000

Example 2

$z_1$=40; $z_2$=41; $z_3$=40; $z_4$=40; Ratio R=82.000

Example 3

$z_1$=45; $z_2$=50; $z_3$=40; $z_4$=40; Ratio R=20.000

Example 4

$z_1$=30; $z_2$=50; $z_3$=40; $z_4$=40; Ratio R=5.000

Figure 3:
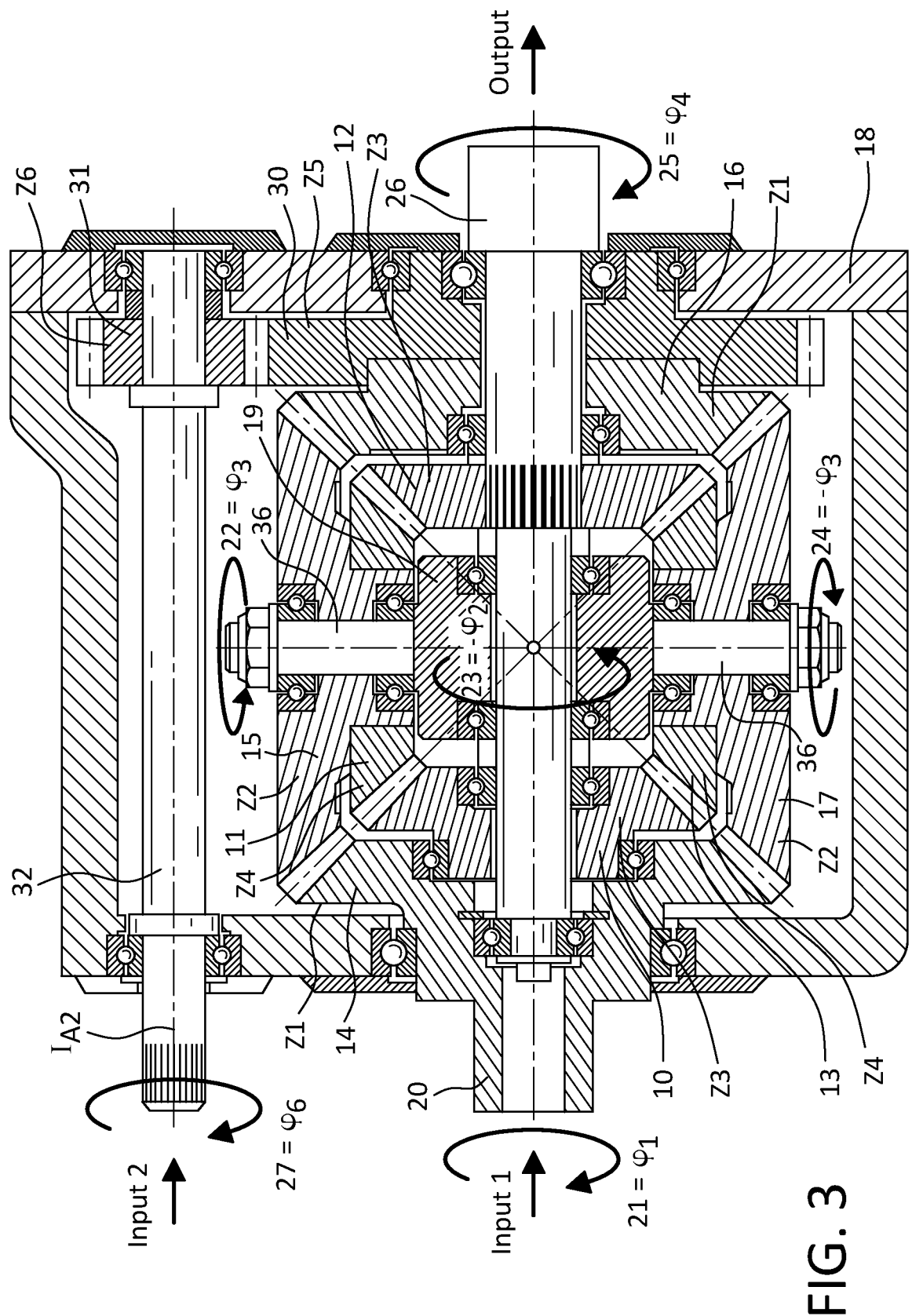
FIG. 3 illustrates an expanded double differential with two inputs.

An expansion of the function of the double differential transmission is shown in FIG. 3 comprising a two-dimensional view of an expanded double differential with two input shafts. By comparison to FIG. 2, in FIG. 3 the gears 30, 31 and shaft 32 have been added. In the expanded arrangement second outer side gear 16 is not rotationally constrained by the housing 18 but gear 16 is now connected to a first cylindrical gear 30, which it is arranged rotatable with respect to the housing 18, and which is in mesh with a second cylindrical gear 31 (i.e. pinion) that is connected to a second input shaft 32 rotatable about input axis $I_{A2}$. This possibility of a second input allows for a variety of input speed combinations with two different prime movers, for example electrical motors, which have different speed and torque characteristics. One motor, for example, can be a high torque and low speed motor which runs on a constant speed signal without speed regulation. The second motor would then, for example, rotate backwards if an output RPM of zero is required. In case of quick acceleration up to a vehicle cruising speed, for example, the second motor is first turned off and the stored kinetic energy of the differential gears and the carrier is used for the vehicle acceleration. Several seconds later, when the vehicle reaches half of its cruising speed, for example, the second motor is now actuated in the positive rotational direction. During the first phase of the acceleration, high amounts of energy are drawn from the battery of a conventional electrical vehicle. The expanded double differential allows storing kinetic energy during gentle driving periods and during deceleration and breaking actions.

Second outer side gear 16 is connected to first cylindrical gear 30 which is arranged rotatable to the housing 18, and in mesh with second cylindrical gear 31 which is connected to a second input shaft 32. In the case of two input shafts there is not one number for the ratio which leads to the following relationship between the output rotation to the two input rotations:

| or: | $\varphi_2 = \varphi_3 \cdot z_2/z_1$ | (11) |
|---|---|---|
| | $\varphi_3 = (\varphi_2 - \varphi_5) \cdot z_1/z_2$ | (12) |
| | $\varphi_4 = \varphi_2 - \varphi_3 \cdot z_4/z_3$ | (13) |
| | $\varphi_1 = \varphi_2 + \varphi_3 \cdot z_1/z_2$ | (14) |
| plug (12) in (14): | $\varphi_1 = \varphi_2 + (\varphi_2 - \varphi_5) \cdot z_1/z_2 \cdot z_2/z_1 = 2 \cdot \varphi_2 - \varphi_5$ | (15) |
| or: | $\varphi_2 = (\varphi_1 + \varphi_5)/2$ | (16) |
| plug (16) in (13): | $\varphi_4 = (\varphi_1 + \varphi_5)/2 - \varphi_3 \cdot z_4/z_3$ | (17) |
| plug (16) in (12): | $\varphi_3 = [\varphi_1 + \varphi_5)/2 - \varphi_5] \cdot z_1/z_2$ | (18) |
| plug (18) in (17): | $\varphi_4 = (\varphi_1 + \varphi_5)/2 \cdot [1 - z_1/z_2 \cdot z_4/z_3] + \varphi_5 \cdot z_1/z_2 \cdot z_4/z_3$ | (19) |
| second input rotation: | $\varphi_6 = \varphi_5 \cdot z_5/z_6$ | (20) | wherein:

$z_5$ . . . Number of teeth gear 30
$z_6$ . . . Number of teeth gear 31
$\varphi_5$ . . . Rotation Angle of gears 16 and 30

Two special cases can be encountered by applying Equation (19) for different input rotations $\varphi_6$. In case 1, the output speed (rotation angle $\varphi_4$) is equal the speed of gear 16 (rotation angle $\varphi_5$). In this case, the output rotation $\varphi_4$ is equal the input rotation $\varphi_1$ which results in a ratio of R=1.00:

| $\varphi_5 = \varphi_4$ plugged in (19) $\rightarrow$ | $\varphi_4 = (\varphi_1 + \varphi_4)/2 \cdot (1 - z_1/z_2 \cdot z_4/z_3) + \varphi_4 \cdot z_1/z_2 \cdot z_4/z_3$ | (21) |
|---|---|---|
| (21) solved for $\varphi_4$: | $\varphi_4/2 \cdot (1 - z_1/z_2 \cdot z_4/z_3) = \varphi_1/2 \cdot (1 - z_1/z_2 \cdot z_4/z_3)$ | (22) |
| or simplified: | $\varphi_4 = \varphi_1$ | (23) |
| resulting in: | R = 1.00 | (24) |

In case 2 the input rotation $\varphi_5$ is zero which simplifies equation (19) and it becomes equal to equation (9):

| $\varphi_5 = 0$ plugged in (19): | $\varphi_4 = (\varphi_1 + 0) \cdot (1 - z_1/z_2 \cdot z_4/z_3) + 0 \cdot z_1/z_2 \cdot z_4/z_3$ | (25) |
|---|---|---|
| elimination of zero terms: | $\varphi_4 = \varphi_1/2 \cdot [1 - z_1/z_2 \cdot z_4/z_3]$ | (26) |

Equation (9) is based on the fact that gear 16 is rigidly connected to the transmission housing which presents the case $\varphi_5=0$ which in turn proves that equation (19) is conclusive.

The gears in a double differential can be straight bevel gears, spiral bevel gears or face gears with cylindrical gears. In case of high input speeds, ground spiral bevel gears will deliver the highest efficiency and the lowest noise emission in connection with a high load carrying capacity. Axial forces in a double differential are similar to the forces in an automotive differential with straight bevel gears.

Due to the fact that gears with hypoid offsets are preferably not used, the relative surface sliding has no component in face width direction, but consists only of profile sliding. The relative profile sliding of a spiral bevel gearset with a ratio which is close to 1.0 and an outer diameter of 120 mm (typical for automotive double differential transmissions) with a speed of 1,000 RPM amounts to a maximum of about 84 m/min. The relative speed between the two fastest gears (14 and 15) in a double differential transmission is only about 50% of the input speed. Equation 8, $\varphi_3=\varphi_1/2 \cdot z_1/z_2$ delivers a speed of gear 15 which is only 48.8% of the input speed, if $z_1=40$ and $z_2=41$ ($\varphi_3=\varphi_1/2 \cdot 40/41=0.488 \cdot \varphi_1$). The relative speed between gear 14 and gear 15 is therefore in this case $\varphi_1-\varphi_3=0.512 \cdot \varphi_1$. This means the relative speed between the fastest gears in a double differential transmission is typically only about half of the input speed. If the input speed is 10,000 RPM then the double differential has only 10·84 m/min·0.512=430.08 m/min. Compared to a standard spiral bevel gear transmission, the double differential transmission has, in this case, only 51.2% of the sliding velocity. An overview of the sliding velocities and efficiencies of the mentioned different types of transmissions is provided in Table 1. The sliding velocity and efficiency calculations on which Table 1 is based may be determined by commercially available software such as, for example, Gleason UNICAL™ bevel gear analysis and optimization software.

TABLE 1

| Gear Type | Ratio | Pinion Diameter | Ring Gear Diameter | Pinion RPM | Relative Sliding | Efficiency |
|---|---|---|---|---|---|---|
| Hypoid | 3.5 | 50 mm | 120 mm | 10,000 RPM | 1,450 m/min | 97.9% |
| Super Reduction Hypoid | 15 | 35 mm | 120 mm | 10,000 RPM | 617 m/min | 89.4% |
| Spiral Bevel | 1 | 120 mm | 120 mm | 10,000 RPM | 840 m/min | 99.3% |
| Double Differential | 80 | 120 mm | 120 mm | 10,000 RPM | 430 m/min | 98.8% |

The comparisons in Table 1 clearly shows the advantage of double differential reductions over other types of speed reducers. Lower relative surface sliding indicates lesser friction resulting in higher transmission efficiency. Less friction also results in less heat being generated within the transmission. The calculated gear efficiencies are shown in the last column of Table 1. A high gear efficiency value of 98.8% for a ratio of 80, and at a transmission input speed of 10,000 RPM has not been reported in state of the art transmissions.

The expanded double differential allows a variety of applications due to the second input (Input 2). If, for example, Input 2 is connected to a low speed high torque motor with a non-variable speed of 1,500 RPM rotates the clockwise (CW) direction and Input 1 is connected to a variable high speed low torque motor which rotates in the counter-clockwise (CCW) direction, then it is possible to choose the speed of Input 1 (e.g. −9,500 RPM) such that the output speed is zero RPM. This example is based on the following number of teeth:

$z_1=45$;

$z_2=50$;
$z_3=40$;
$z_4=40$;
$z_5=60$;
$z_6=20$;
with a speed of Input 2 (shaft 32) of $n_6=1,500$ RPM CW (equal positive), and the first reduction $z_6/z_5=20/60$, the speed of gear 30 is equal to $n_5=500$ RPM. The speed of the output shaft is $n_4=0$.

Equation (19) is also valid if instead of the angles φ the rotational speeds n in RPM are used:

$$\begin{aligned}
&\text{becomes:} && n_4 = (n_1 + n_5)/2 \cdot [1 - z_1/z_2 \cdot z_4/z_3] + n_5 \cdot z_1/z_2 \cdot z_4/z_3 \\
&&& 0 = (n_1 + 500)/2 \cdot [1 - 45/50 \cdot 40/40] + 500 \cdot 45/50 \cdot 40/40 \\
&\text{or:} && 0 = (n_1/2 + 250) \cdot 0.1 + 450 \\
&\text{resulting in:} && n_1 = -9,500 \text{ RPM}
\end{aligned}$$

A practical application of this example can be a vehicle idling in front of an intersection traffic light. When the red light changes to green, $n_1$ can reduce from −9,500 RPM to zero in order to accelerate the vehicle from 0 MPH to 35 MPH. During the acceleration period, the kinetic energy of the double differential assembly with gears 10, 11, 12, 13, 14, 15, 16 and 17 as well as the carrier 19 and the motor connected to Input 1 is utilized to deliver the majority of the acceleration energy. Driving faster than 35 MPH will simply require rotating the input in the opposite direction. At a vehicle speed of 70 MPH the speed of Input 1 will reach $n_1=+9,500$ RPM. Depending on the duty cycle of a vehicle (high way or city driving) the low speed motor can be turned off and a clutch (not shown) can be applied in order to lock Input 2. In this case, the variable speed motor connected to Input 1 will deliver all the energy required for example for a light duty city driving.

When attempting to constantly back-charge bursts of recuperative energy to a battery, the electrical efficiency becomes very low and the battery's chemical capacity to accept large amounts of energy within only several seconds is limited. For example, a medium size sedan which drives with 35 MPH has about 0.4 kWh kinetic energy. Reducing the speed rather quickly in front of a traffic light which just turned red would require recuperating the 0.4 kWh within about 2 to 3 seconds. As a result, it is likely that not more than 0.10 to 0.15 kWh can be back-charged to the battery and 0.25 kWh are converted to heat, either in the brake disks or in the electronic vehicle control modules. The double differential including the motor on Input 1 can store about 0.24 kWh with an efficiency of about 96%, which means that 0.23 kWh are available in form of a rotation of the double differential when the vehicle comes to a full stop before the red light. This energy will be used only several minutes later to accelerate the vehicle after the traffic light turns green. Short term energy storage cannot be done efficiently with today's battery technology. The double differential concept allows in turn reducing the size of the battery by maintaining the same mileage capacity.

The combination of two input speeds enables a wide variety of possibilities to adopt the double differential transmission to different driving conditions by achieving an optimal motor and transmission efficiency. The additional aspect of easy energy storage in a fast rotating differential carrier unit will support the vehicle batteries especially when high energy bursts are required for example to accelerate a heavy truck from zero MPH to 30 MPH. In contrast to internal combustion engines, electric motors require very little energy while they run in idle without any external resistance.

The double differential with two inputs can also be utilized to collect and transmit the energy from an electric motor and a combustion engine to the driving wheels of a hybrid vehicle. With such an arrangement, optimal speed combinations for each of the two prime movers can be found, which also allows the elimination of any additional transmission in the hybrid vehicle.

As previously mentioned, first inner side gear 10 is not required for the function of the double differential. It was used to make the transmission symmetric and it was anticipated that in case of large tooth and transmission housing deformation (under high load), gear 10 would help to keep the torque on gears 11 and 13 equal. If symmetry and balance are not an issue, then gear 10 and, additionally, gears 13 and/or 17 may be eliminated in order to simplify the double differential transmission to comprising seven, six or even five gears, thereby reducing manufacturing cost.

Figure 4:
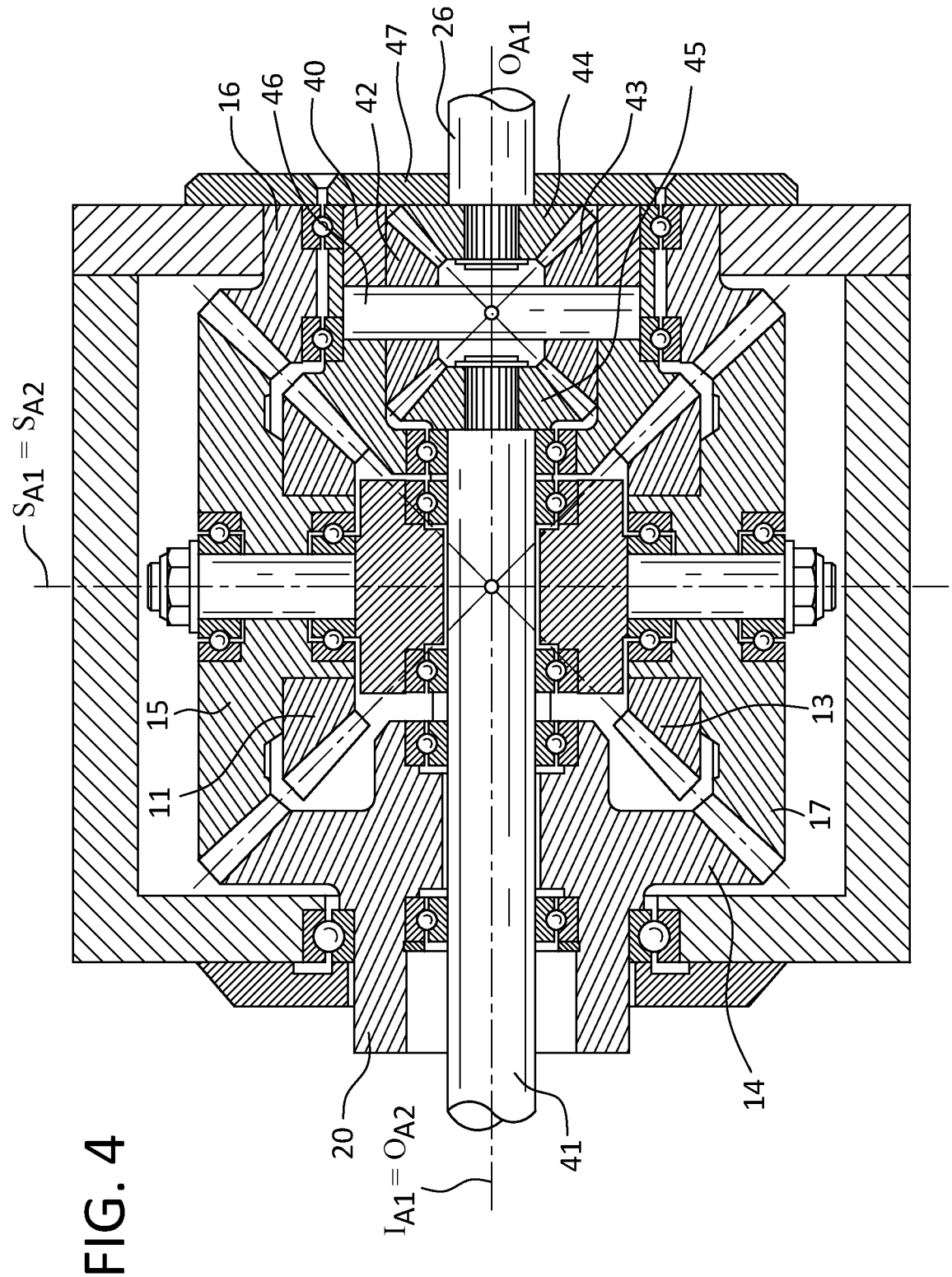
FIG. 4 shows a double differential with additional differential function between two output shafts.

In order to allow placing the inventive double differential transmission between the wheels of a drive axle in a vehicle, an additional embodiment is shown in FIG. 4 which shows a two dimensional view of a modified version of the double differential from FIG. 2. The transmission in FIG. 4 has an additional differential function between the two output shafts 26 and 41. Output shaft 26 remains on the right side of the transmission housing and the added output shaft 41, rotatable about output axis $O_{A2}$, exits the transmission housing at the left side. Gear 10 which is not required for the correct function of the double differential has been eliminated and shaft 41 acts now as main transmission shaft, which was the function of shaft 26 in FIG. 2. First inner side gear 12 in FIG. 2 has been replaced in FIG. 4 by gear 40. Gear 40 is hollow inside in order to create a space for the placement of 4 differential gears 42, 43, 44 and 45. Gears 42 and 43 are the planets which are held in position relative to gear 40 by pin 46. Pin 46 is connected to gear 40, which is the gear with the final output speed. Gears 44 and 45 are the side gears. Output shaft 26 is connected to side gear 44 and output shaft 41 is connected to side gear 45. The design in FIG. 4 will accomplish the same differential function between the two output shafts 26 and 41 as explained with FIG. 1 for the output shafts 7 and 6. The end cap 47 closes the differential inside of gear 40 and acts as a radial sleeve bearing of shaft 26 and as a thrust sleeve bearing for gear 44. The walls of the hollow space in gear 40 are utilized as thrust sleeve bearings of gears 42 and 43. Preferably, axes input axis Im and output axis $O_{A2}$ are parallel and, more preferably, coincident (i.e. $I_{A1}=O_{A2}$).

The transmission in FIG. 4 contains an additional differential, which accommodates different wheel speeds while the vehicle is for example driving through a bend. A differential, similar to the one shown in FIG. 1 has been integrated in gear 40. The transmission in FIG. 4 has and output shaft 26 which may be connected to the right wheel and an output shaft 41 which may be connected to the left wheel. The input shaft 20 is still located at the left side of the transmission. If input shaft 20 is connected to an electric motor with a hollow shaft, then the inventive transmission and the driving electric motor can be in-line with the drive axle of a vehicle. This means that output shaft 26 can be connected via a first drive shaft and constant-velocity (CV) joints to the right side driving wheel and output shaft 41 can be connected via a second drive shaft and CV joints to the left side driving wheel.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A transmission comprising a housing, at least a first input and at least a first output, said transmission further comprising:
   a first outer side gear, said first outer side gear being a bevel gear and being connected to and drivable by the first input,
   a first planet gear set, said first planet gear set comprising a first inner planet gear and a first outer planet gear, said first inner planet gear and said first outer planet gear each being a bevel gear with said first inner planet gear being rigidly connected to, and in axial alignment with, said first outer planet gear, said first planet gear set being rotatable via said first outer side gear,
   a second outer side gear, said second outer side gear being a bevel gear and being in mesh with said first outer planet gear,
   a second inner side gear, said second inner side gear being a bevel gear and being connected to the first output, said second inner side gear being rotatable via said first inner planet gear,
   the first input being rotatable about a first input axis,
   the first output being rotatable about a first output axis,
   said first inner planet gear being rotatable about a first planet gear axis and said first outer planet gear being rotatable about said first planet gear axis thereby resulting in said first planet gear set being rotatable about said first planet gear axis,
   said first planet gear set being further rotatable about said first output axis,
   said second inner side gear being rotatable about said first output axis,
   said transmission further comprising a second planet gear set arranged opposite from said first planet gear set, said second planet gear set comprising:
   a second inner planet gear and a second outer planet gear, said second inner planet gear and said second outer planet gear each being a bevel gear with said second inner planet gear being rigidly connected to, and in axial alignment with, said second outer planet gear, said second planet gear set being rotatable via said first outer side gear,
   said second inner planet gear being rotatable about a second planet gear axis and said second outer planet gear being rotatable about said second planet gear axis thereby resulting in said second planet gear set being rotatable about said second planet gear axis,
   said second planet gear set being further rotatable about said first output axis.

2. The transmission of claim 1 wherein said first input axis and said first output axis are parallel to one another.

3. The transmission of claim 2 wherein said first input axis and said first output axis are coincident with one another.

4. The transmission of claim 1 wherein said second outer side gear is non-rotatable.

5. The transmission of claim 1 wherein, for a predetermined rotational velocity of the first input:
   rotation of said first planet gear set about said first output axis effects a first rotational differential component of said second inner side gear, and
   rotation of said first planet gear set about said first planet gear axis effects a second rotational differential component of said second inner side gear,
   wherein said first rotational differential component and said second rotational differential component result in a second inner side gear velocity and first output rotational velocity less than the predetermined input rotational velocity.

6. The transmission of claim 1 wherein said first planet gear axis and said second planet gear axis are coincident with one another.

7. The transmission of claim 1 further comprising:
   a second input rotatable about a second input axis, said second input including a first cylindrical gear rotatable about said second input axis,
   said transmission further including a second cylindrical gear rotatable about said first output axis and being in mesh with said first cylindrical gear, said second cylindrical gear being rigidly connected to said second outer side gear.

8. The transmission of claim 1 further comprising:
   said second inner side gear having an inner space and including a differential mechanism comprising a plurality of bevel gears located within said inner space.

9. The transmission of claim 8 further comprising a second output rotatable about a second output axis, and wherein said first output and said second output are connected to said second inner side gear and said differential mechanism.

10. The transmission of claim 9 wherein said first output and said second output extend in opposite directions.

11. The transmission of claim 9 wherein the second output extends into and through the first input.

12. A method of reducing the rotational velocity of an input shaft in a transmission according to claim 1, said method comprising:
    rotating said input shaft at a predetermined rotational velocity, said rotating thereby effecting:
    rotating said first planet gear set about said first output axis thereby resulting in a first rotational differential component of said second inner side gear connected to said output shaft, and
    rotating of said first planet gear set about said first planet gear axis thereby resulting in a second rotational differential component of said second inner side gear connected to said output shaft,
    wherein said first rotational differential component and said second rotational differential component result in a rotational velocity of said second inner side gear and said output shaft less than the predetermined rotational velocity of said input shaft.

* * * * *